United States Patent
Benisty et al.

(10) Patent No.: US 12,373,121 B2
(45) Date of Patent: Jul. 29, 2025

(54) ADAPTIVE USE OF MULTIPLE CHANNELS IN A STORAGE DEVICE

(71) Applicant: Western Digital Technologies, Inc., San Jose, CA (US)

(72) Inventors: Shay Benisty, Beer Sheva (IL); Ariel Navon, Revava (IL); Alexander Bazarsky, Holon (IL); Judah Gamliel Hahn, Ofra (IL)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/353,857

(22) Filed: Jul. 17, 2023

(65) Prior Publication Data

US 2025/0028462 A1    Jan. 23, 2025

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC ..... G06F 3/0631; G06F 3/0604; G06F 3/0679
See application file for complete search history.

(56) References Cited

U.S. PATENT DOCUMENTS

| | | | |
|---|---|---|---|
| 8,856,425 B2 | 10/2014 | Shen | |
| 2011/0047316 A1 | 2/2011 | Farhan et al. | |
| 2012/0173827 A1* | 7/2012 | Wood | G11C 11/5642 |
| | | | 711/E12.001 |
| 2012/0221771 A1 | 8/2012 | Yoon et al. | |
| 2013/0308392 A1* | 11/2013 | Nishijima | G11C 11/56 |
| | | | 365/189.02 |
| 2015/0301754 A1* | 10/2015 | Kochar | G06F 3/0679 |
| | | | 711/103 |
| 2016/0019137 A1* | 1/2016 | Ellis | G11C 16/10 |
| | | | 711/103 |
| 2017/0090947 A1* | 3/2017 | Lee | G06F 9/4408 |
| 2018/0173619 A1* | 6/2018 | Sivasankaran | G06F 3/0679 |
| 2018/0276123 A1* | 9/2018 | Matsudaira | G06F 12/0276 |
| 2019/0065388 A1* | 2/2019 | Christensen | G06F 3/0634 |
| 2020/0183622 A1 | 6/2020 | Hubbard | |
| 2022/0129168 A1 | 4/2022 | Tanpairoj et al. | |
| 2022/0326877 A1 | 10/2022 | Byom et al. | |
| 2023/0290419 A1* | 9/2023 | Yang | G11C 16/08 |

* cited by examiner

*Primary Examiner* — Eric T Loonan

(74) *Attorney, Agent, or Firm* — PATTERSON + SHERIDAN, LLP

(57) ABSTRACT

More efficient memory device usage is possible by altering the memory device management. For example, when the full storage capacity of the memory device will not be used, certain portions of the memory device can be shut off and then turned on when the storage capacity is needed. When less capacity is needed, data can be consolidated and certain portions of the memory device can be shut off. Additionally, rather than operating in multilevel cell (MLC) memory, the memory device can start in single level cell (SLC) memory and transition to MLC memory over time. If there is a determination that less memory is needed, the memory device can transition from MLC memory to SLC memory. In so doing, the storage capacity of the memory device is more appropriately utilized.

12 Claims, 8 Drawing Sheets

ADAPTIVE USE OF MULTIPLE CHANNELS IN A STORAGE DEVICE

BACKGROUND OF THE DISCLOSURE

Field of the Disclosure

Embodiments of the present disclosure generally relate to saving power and improving performance of storage devices.

Description of the Related Art

Many storage devices do not utilize much of their storage capacity. For example, a user having a computer for home use may have a 1 TB storage capacity memory device, but a significant amount of the storage capacity is unused. With the use of streaming, cloud based storage, and the general lack of need for storage of information on a home use computer, less information may be stored in a memory device of a home computer. Any locally installed programs will utilize a portion of the storage capacity as will any documents or pictures stored locally. However, a large quantity of the memory device may still be unused.

Videos and pictures can utilize a large amount of storage. Over time, as more information is stored locally, such as pictures and videos, the storage capacity could theoretically be fully utilized. In such a scenario, over time, the available storage capacity will shrink as more and more information is stored in the memory device.

The more of the storage capacity of the memory device that is utilized, the more power that is needed to power the memory device. Additionally, the more of the storage capacity of the memory device that is used, the more of an impact there is for the data storage device performance as the controller of the data storage device will need to monitor and track more data, and retrieval and garbage collections will consume valuable resources of the data storage device and thus decrease device performance.

There is a need in the art for improved utilization of storage capacity in a memory device.

SUMMARY OF THE DISCLOSURE

More efficient memory device usage is possible by altering the memory device management. For example, when the full storage capacity of the memory device will not be used, certain portions of the memory device can be shut off and then turned on when the storage capacity is needed. When less capacity is needed, data can be consolidated and certain portions of the memory device can be shut off. Additionally, rather than operating in multilevel cell (MLC) memory, the memory device can start in single level cell (SLC) memory and transition to MLC memory over time. If there is a determination that less memory is needed, the memory device can transition from MLC memory to SLC memory. In so doing, the storage capacity of the memory device is more appropriately utilized.

In one embodiment, a data storage device comprises: a memory device; and a controller coupled to the memory device, wherein the controller is configured to: configure an entirety of the memory device as single level cell (SLC) memory; detect an increase in need for memory device capacity; and convert at least a portion of the SLC memory to multilevel cell (MLC) memory.

In another embodiment, a data storage device comprises: a memory device; and a controller coupled to the memory device, wherein the controller includes a capacity control module, wherein the controller includes a plurality of channels, wherein each channel is coupled to at least one die of the memory device, and wherein the controller is configured to: predict that an amount of memory that is needed is coupled to a first number of channels that is less than a total number of channels; turn off a second number of channels of the total number of channels; detect an actual use of memory; and determine whether additional channels of the total number of channels should be turned on or off.

In another embodiment, a data storage device comprises: means to store data; and a controller coupled to the means to store data, wherein the controller is configured to: adaptively modify properties of the means to store data and channels operating between the controller and the means to store data according to a host device profile, wherein the adaptively modifying comprises one or more of the following: changing from single level cell (SLC) memory to multilevel cell (MLC) memory; changing from MLC memory to SLC memory; opening an additional channel between the controller and the means to store data; and closing a channel between the controller and the means to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

More efficient memory device usage is possible by altering the memory device management. For example, when the full storage capacity of the memory device will not be used, certain portions of the memory device can be shut off and then turned on when the storage capacity is needed. When less capacity is needed, data can be consolidated and certain portions of the memory device can be shut off. Additionally, rather than operating in multilevel cell (MLC) memory, the memory device can start in single level cell (SLC) memory and transition to MLC memory over time. If there is a determination that less memory is needed, the memory device can transition from MLC memory to SLC memory. In so doing, the storage capacity of the memory device is more appropriately utilized.

Figure 1:
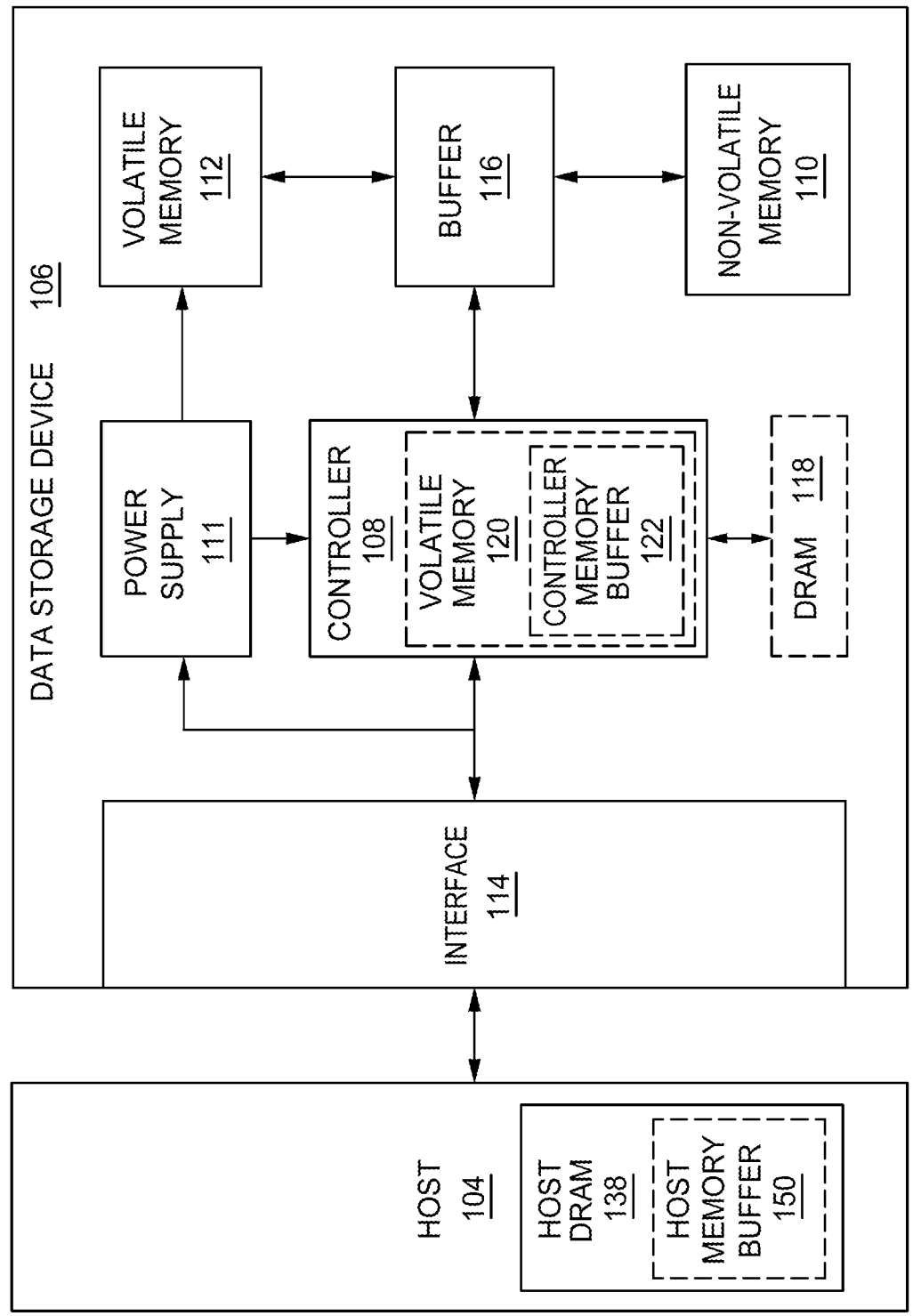
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Currently, there is no method to temporarily reduce exported capacity/performance to optimize power usage in a data storage device. Hybrid memory (i.e., blocks that may be used as either single level cell (SLC) or multilevel cell (MLC)/triple level cell (TLC)/quad level cell (QLC) memory) is currently used for certain blocks in different purposes. The purposes include improving performance in burst conditions or storing particularly sensitive system data. There are currently no known use cases where the entire capacity of the memory device is used as SLC memory in certain conditions and then transformed into MLC (or TLC or QLC) under different conditions in explicit background operation procedures. It is important to note that the acronym MLC will be used herein to include any cell having more than on level such as TLC, QLC, etc.

As will be discussed herein, adaptively modifying the properties of NVM and channels operating between the NVM and the controller according to the host profile will result in optimization of parameters for optimized power consumption. The embodiments discussed herein can be applied when the host device uses a limited capacity from the entire drive that can be accessed through only a part of the available flash channels. Additionally, the embodiments can be applied when the capacity used by the host device can be stored on the SLC memory without or partially resorting to MLC memory. Using the embodiments discussed herein will benefit the user by shutting down part of the available memory and thus saving power. In addition, using SLC memory will reduce stress, error rates, and overall power consumption.

Figure 2:
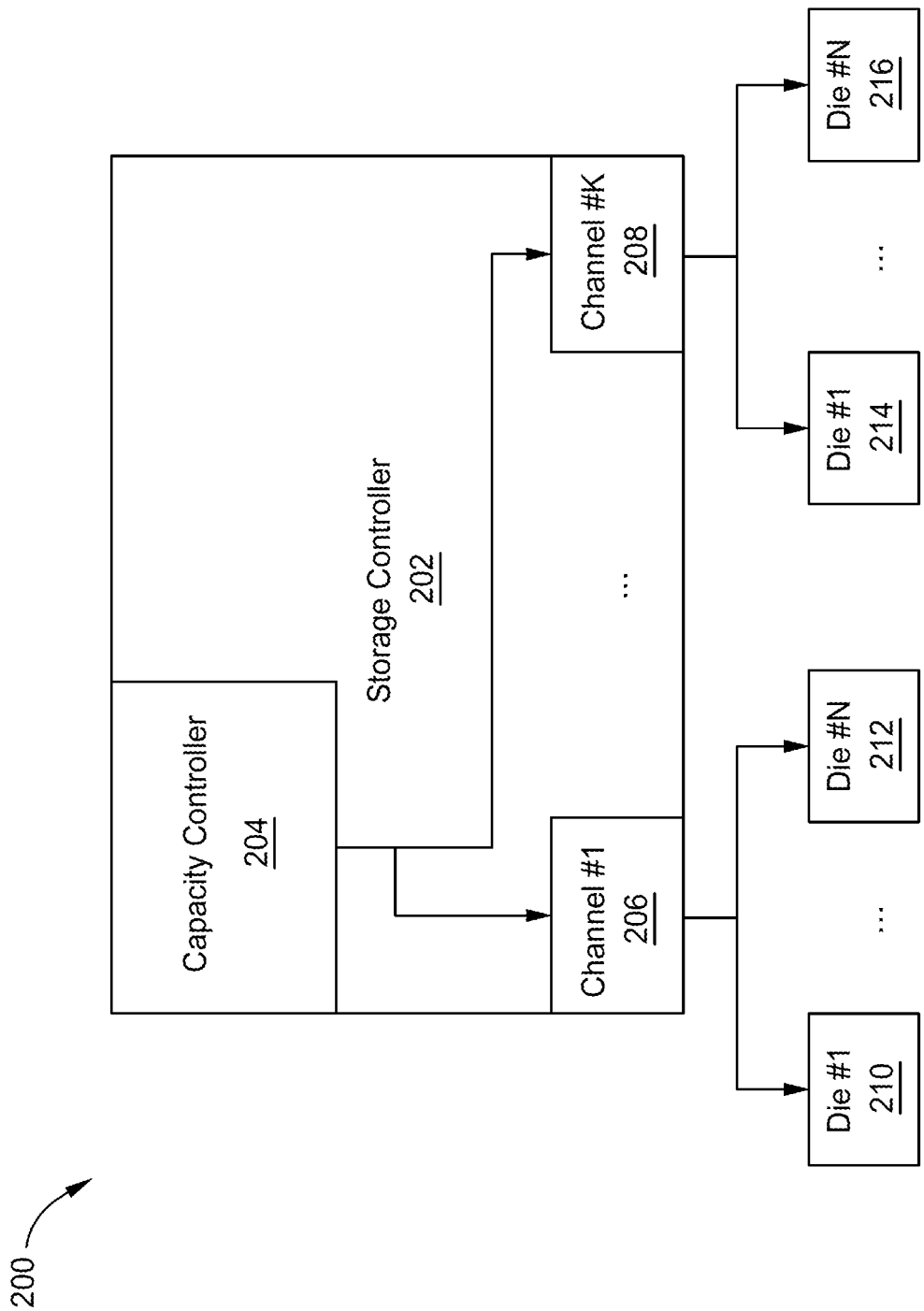
FIG. 2 is a schematic illustration of a proposed architecture according to one embodiment.

FIG. 2 is a schematic illustration of a proposed architecture according to one embodiment. The system 200 includes a storage controller 202 having a capacity control module 204. Additionally, there are two channels shown, channel #1 206 and channel #K 208, but it is to be understood that more channels are contemplated. Additionally, channel #1 206 is shown to have two dies, Die #1 210 and Die #N 212, and channel #K 208 is shown to have two dies, Die #1 214 and Die #N 216. It is to be understood that more dies per channel are contemplated.

The capacity control module 204 is where analysis may be conducted to derive whether some of the channels may be turned off under the given workload and capacity state. For example, if a controller is designed to have 16 flash channels to comply with capacity demand, in cases when the host doesn't need the capacity, the device may use 8 flash channels to still meet the performance demand, while saving power significantly. Deriving whether the host needs capacity may be done through analysis of its past usage of the flash memory, or by an informed configuration by the host. For example, if the host has been using only 1 TB of capacity out of its 4 TB device in the past month, it can be assumed that the host wouldn't need more than 2 TB in the next day. Naturally, other heuristics may be applied. The capacity control module 204 additionally determines when and what amount of memory to transition between SLC memory and MLC memory.

Figure 3:
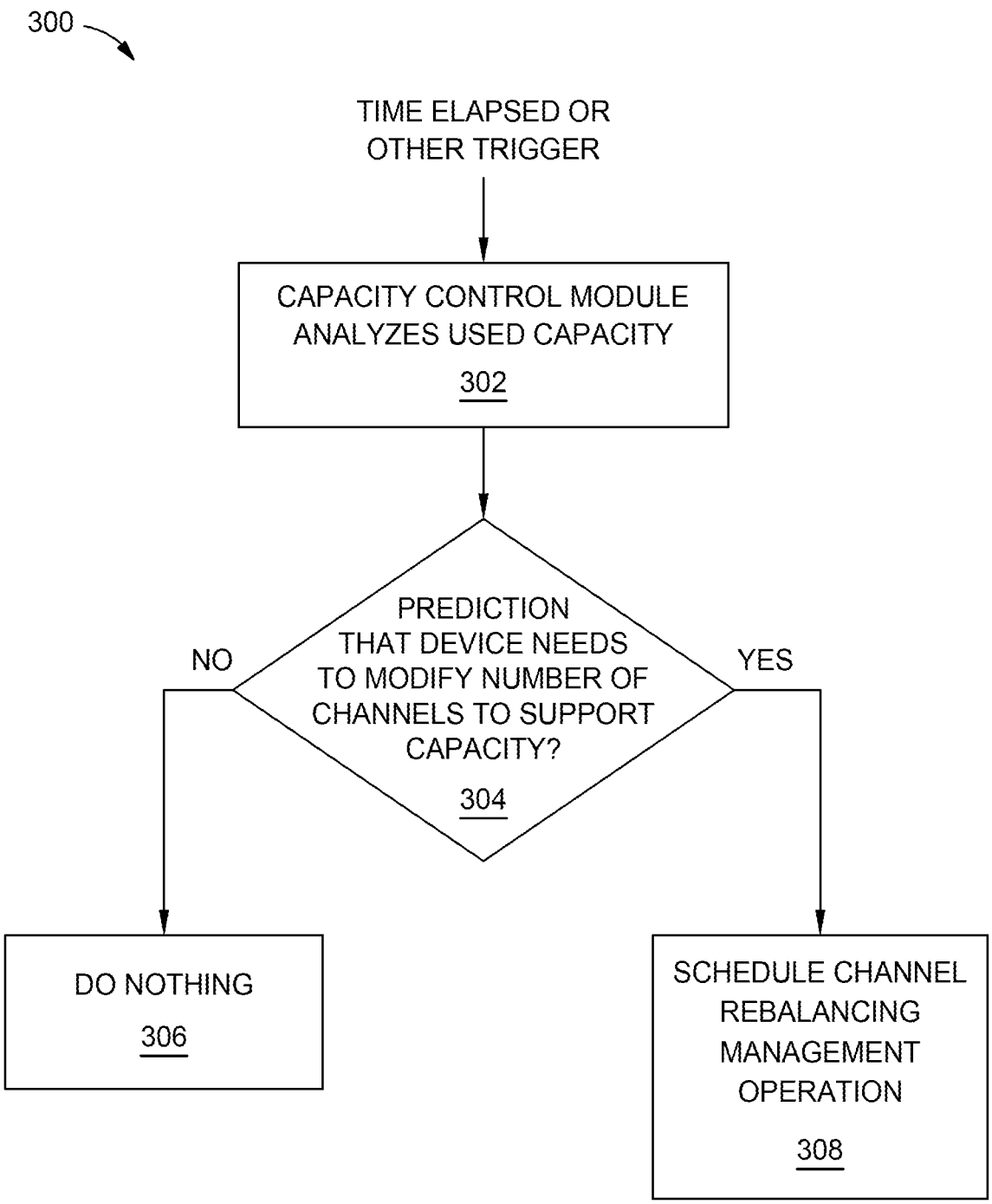
FIG. 3 is flowchart illustrating a channel rebalancing according to one embodiment.

FIG. 3 is flowchart 300 illustrating a channel rebalancing according to one embodiment. As shown in FIG. 3, after a predetermined period of time has elapsed, or some other trigger occurs, the capacity control module analyzes the capacity of the memory device that has been used at 302. Thereafter, a prediction is made whether the device needs to modify the number of channels to support the capacity at 304. If there is no modification, the controller does nothing at 306, but if there is a need to modify, the controller schedules a channel rebalancing management operation at 308. An example of a predetermined period of time is once per day.

In another embodiment, in the same usage scenario, the memory type within the dies may be selected such that power usage is reduced and performance increased. In each memory die, cells can either store a single bit per cell as SLC or multi bits per cell as MLC. SLC has reduced error rates, better performance, and as a result less power consumption. However, SLC can store less data in the same memory size. Memory type of blocks can be switched during the life of the device. Such blocks are called hybrid blocks, and usually also have a different trim—memory configuration settings for writing and reading. It is proposed herein to use as much of the memory dies as SLC as possible. For example, if the die can store 1 Tb as TLC, the die can store a third of 1 Tb as SLC using the same cells. If a host is consistently using less than a third of the capacity, all the blocks can be used as SLC. However, the decision on block type can be taken on a die or partial die level. The decision on block type usage can be taken independently from the decision on the number of channels in the previous embodiment.

Figure 4:
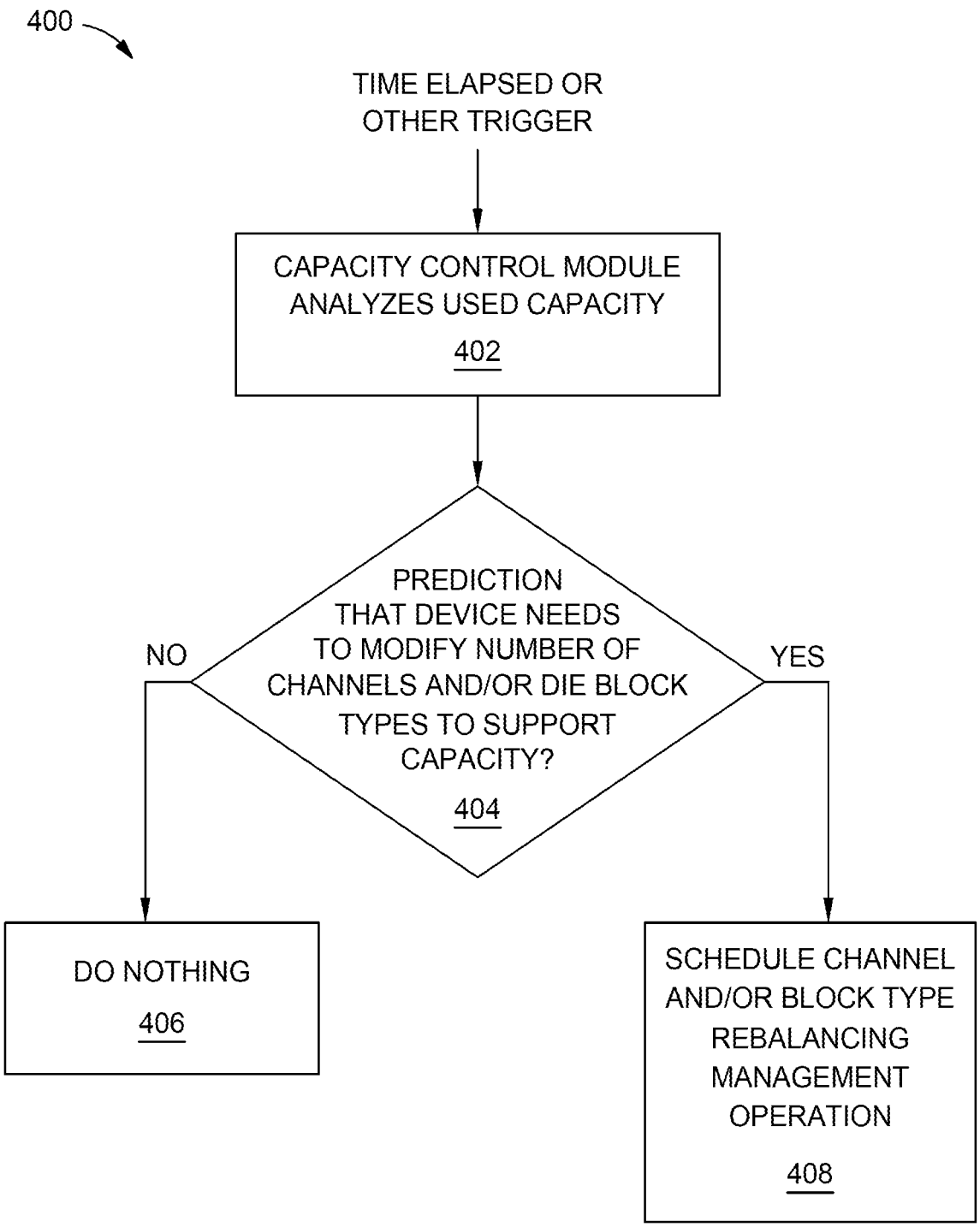
FIG. 4 is a flowchart illustrating a block type rebalancing according to one embodiment.

FIG. 4 is a flowchart 400 illustrating a block type rebalancing according to one embodiment. As shown in FIG. 4, after a predetermined period of time has elapsed, or some other trigger occurs, the capacity control module analyzes the capacity of the memory device that has been used at 402. Thereafter, a prediction is made whether the device needs to modify the number of channels and/or die block types to support the capacity at 404. If there is no modification, the controller does nothing at 406, but if there is a need to modify, the controller schedules a channel and/or block type rebalancing management operation at 408. An example of a predetermined period of time is once per day.

As will be discussed below, different embodiments of the flash translation layer (FTL) implementation in the context of the modification of the number of operating channels during the device life are shown. Usually, data is striped across multiple operating dies/channels in order to maximize parallelism when operating sequentially. The corresponding block on each of the dies/channels is grouped together to form a metablock. The approach with respect to the embodiments may be such that the metablock is defined per channel group (e.g., one metablock is defined on 8 channels and another metablock is defined on the other 8 channels). In this mode, there is no option to increase performance through using more channels, but only via increased capacity. It is then easy to change the number of channels. In another embodiment, once the number of channels is increased, the metablock may be rebalanced between all the channels, so that performance is increased accordingly. This operation involves rewriting parts of the already written memory to the dies on the added channels. This may be a relatively long operation which may require many reads and writes. In some devices, a scheduled window for long management operations can be defined, in which the device is guaranteed to be powered up and allowed to perform long management operations.

Figure 5:
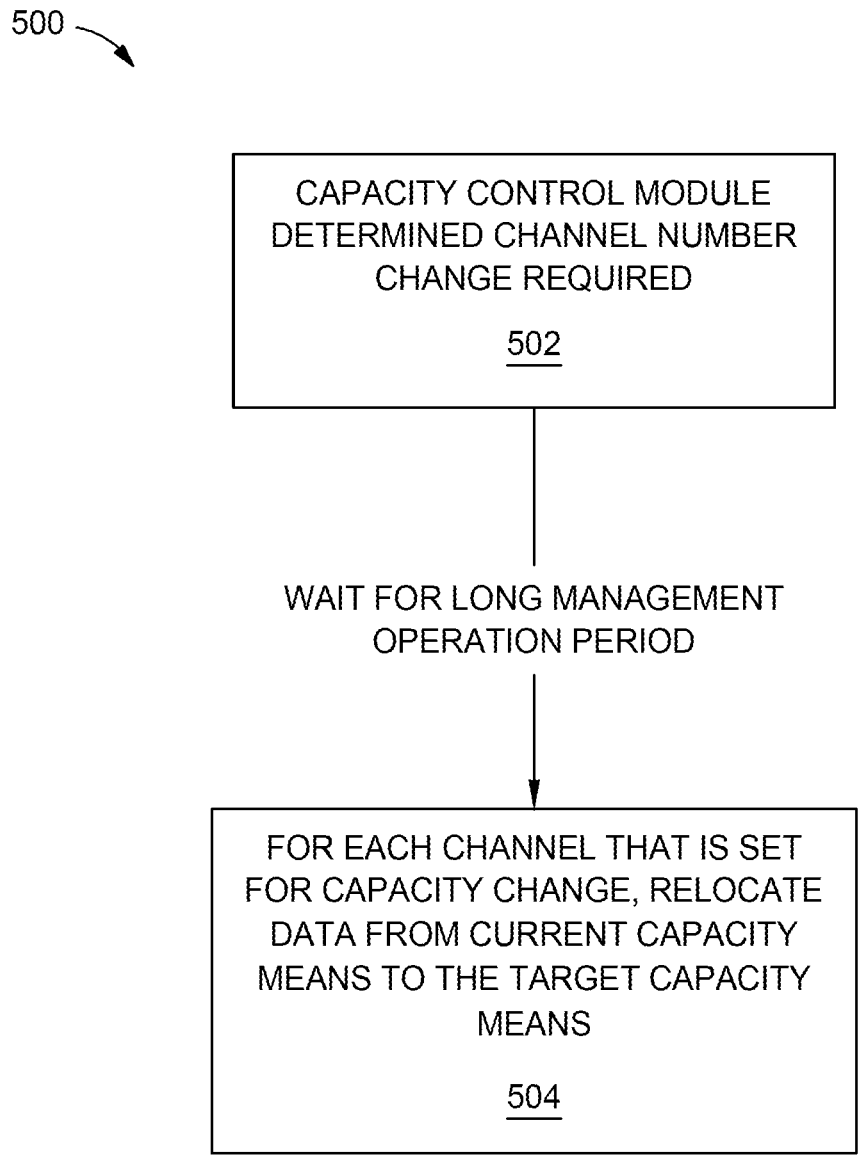
FIG. 5 is a flowchart illustrating a channel rebalancing process according to one embodiment.

FIG. 5 is a flowchart 500 illustrating a channel rebalancing process according to one embodiment. Initially, the capacity control modules determines that a channel number change is necessary at 502. Then, a long management operation period occurs. Thereafter, for each channel that is set for a capacity change, data is relocated from the current capacity means to the target capacity means at 504.

In another embodiment, when the device is using the embodiment regarding SLC blocks instead of higher density blocks (assuming QLC for brevity), and the capacity control module decides that capacity increase is needed, a portion of the blocks may be rewritten from SLC to QLC. The other direction is also true, if the capacity control module decides that capacity reduction is allowed, data can be rewritten from QLC to SLC. It is implied that the thresholds are such that rewrite amount is minimized so that it does not happen often enough to impose on the device health. It is proposed to use the scheduled management window for this process as well.

Figure 6:
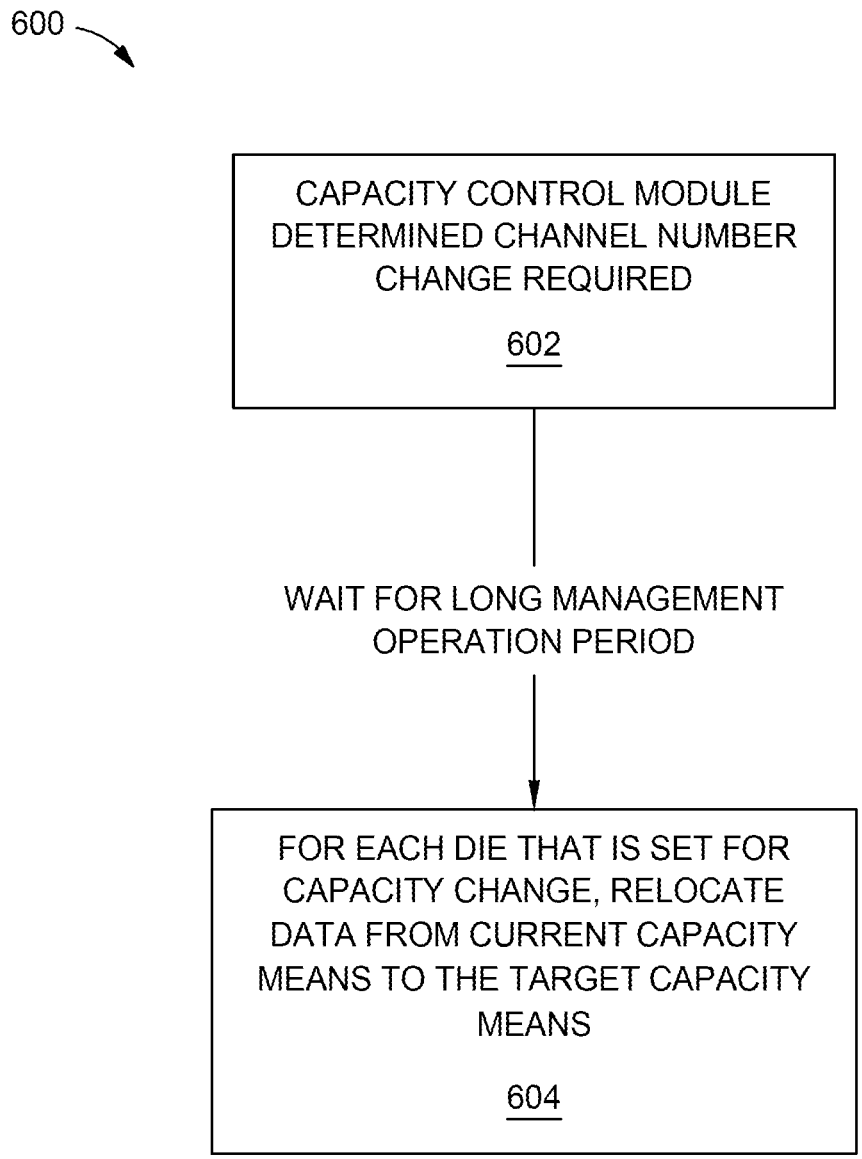
FIG. 6 is a flowchart illustrating a die capacity change process according to one embodiment.

FIG. 6 is a flowchart 600 illustrating a die capacity change process according to one embodiment. Initially, the capacity control modules determines that a capacity change is necessary at 602. Then, a long management operation period occurs. Thereafter, for each die that is set for a capacity change, data is relocated from the current capacity means to the target capacity means at 604. It should be noted that if the capacity projection changes rapidly, such that a rebalancing or capacity change decision cannot wait for a maintenance window, it can be executed as a foreground procedure. This will cause significant but temporary performance loss while the operation is ongoing.

Figure 7:
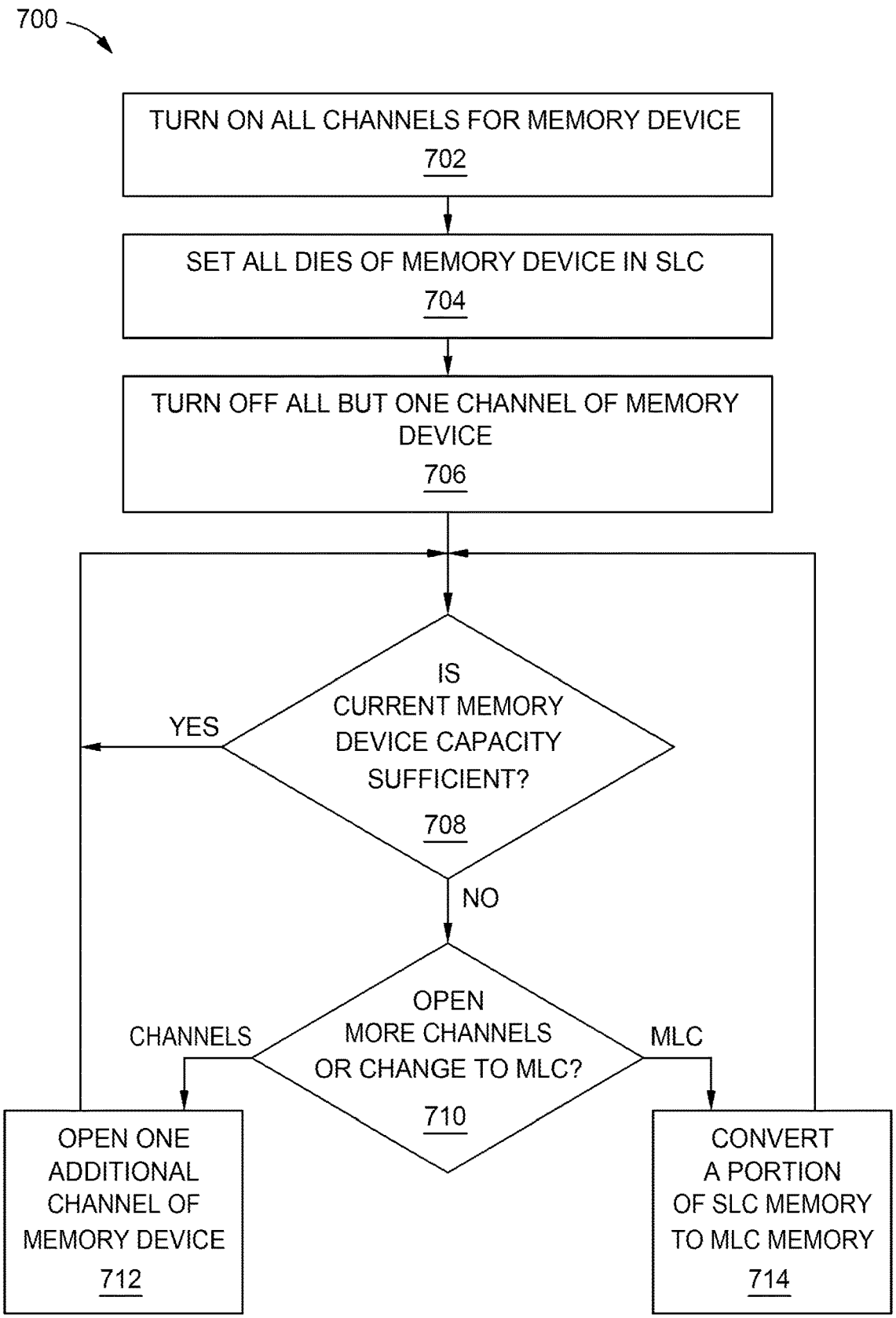
FIG. 7 is a flowchart illustrating effective memory device management according to one embodiment.

FIG. 7 is a flowchart 700 illustrating effective memory device management according to one embodiment. In FIG. 7, at the beginning of the device lifetime, all channels are turned on at 702 and all dies are set to SLC memory at 704. Then, all but one channel is turned off at 706 so that the data store device can operate in the most efficient manner possible. Over time, more memory may be needed (i.e., an increase in storage capacity may be needed). Thus, there is a check to determine whether the current capacity is sufficient at 708. If the capacity is sufficient, then the data storage device continues to operate without change, but if there is not sufficient capacity at 708, then a decision is made at 710 regarding whether to open more channels or to change some SLC memory to MLC memory. If the decision to open more channels, then one more channel is opened at 712 and a reassessment occurs at 708 regarding whether there is sufficient memory capacity. If there is insufficient memory capacity, then a decision can again be made regarding whether to open more channels or switch from SLC memory to MLC memory. If the decision at 710 is to change to MLC, then a portion of SLC memory is converted to MLC memory. In so changing from SLC to MLC, some data may be relocated. In any event, after changing some memory from SLC to MLC, a reassessment occurs at 708 regarding whether there is sufficient memory capacity. If there is insufficient memory capacity, then a decision can again be made regarding whether to open more channels or switch from SLC memory to MLC memory.

Figure 8:
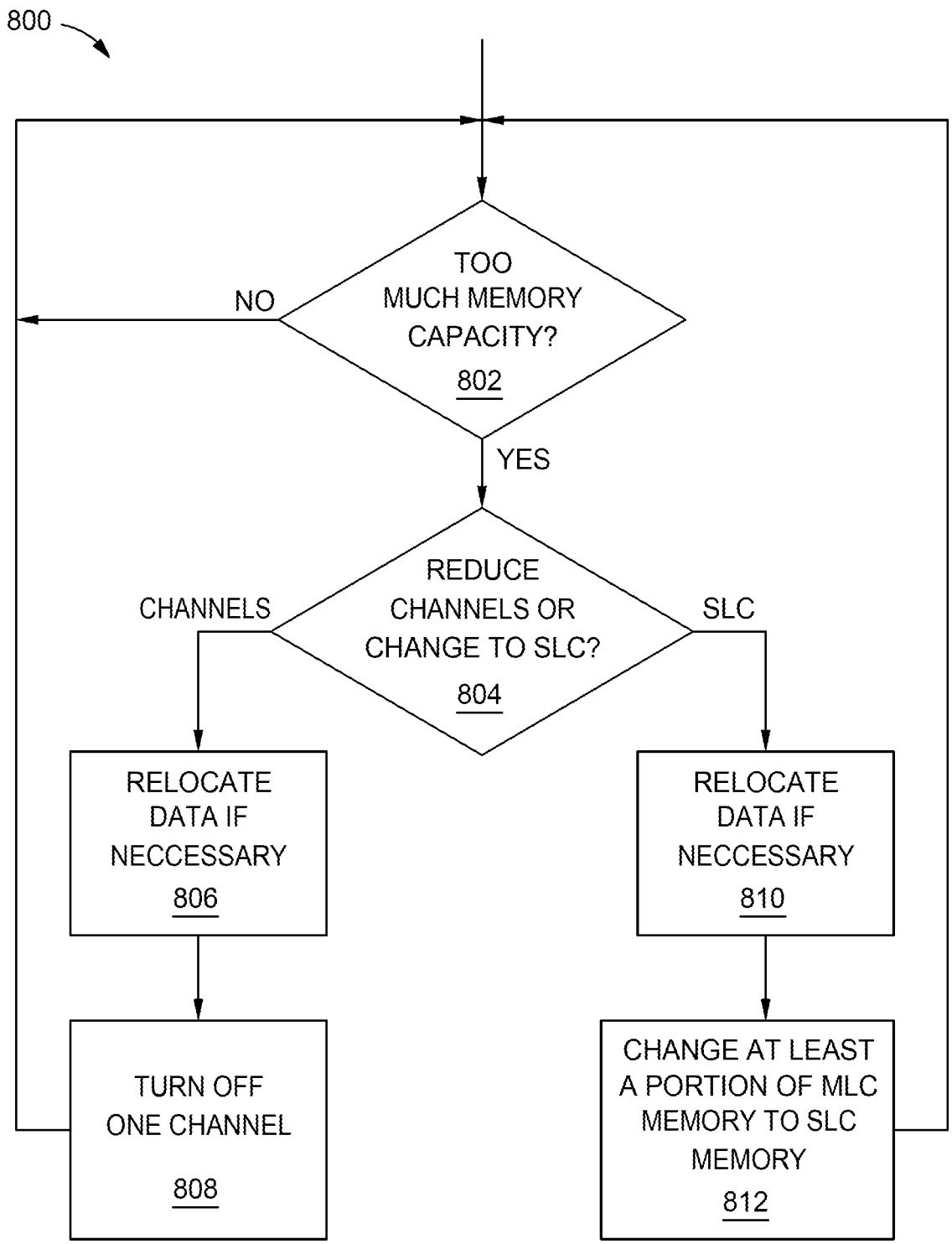
FIG. 8 is a flowchart illustrating effective memory device management according to one embodiment.

The converse of FIG. 7 is also contemplated such that the capacity can be reduced. FIG. 8 is a flowchart 800 illustrating effective memory device management according to one embodiment. In FIG. 8, a determination is made at 802 at some point in time whether there is too much device capacity which negatively impacts data storage device performance. If there is not too much capacity, then the data storage device continues to operate normally and the capacity/performance balance is monitored. If, however, the capacity/performance balance is incorrect such that there is too great a capacity, then a decision is made at 804 regarding whether to reduce the number of open channels or to change at least a portion of the memory to SLC memory. If the decision is to close or turn off a channel, then any data relocation that is necessary is performed at 806, a channel is turned off at 808, and the capacity/performance balance is monitored. If the decision is to change a portion of memory to SLC memory, then any data relocation that is necessary is performed at 810, a portion of memory is changed from MLC memory to SLC memory at 812, and the capacity/performance balance is monitored. In any event, after changing some memory from MLC to SLC or turning off a channel, a reassessment occurs regarding whether there is too much capacity. If there is too much capacity and hence, poor performance, then a decision can again be made regarding whether to close more channels or switch from MLC memory to SLC memory.

It is to be noted that FIGS. 7 and 8 do not need to operate independently. Rather, it is contemplated that the storage capacity and device performance balance is regularly evaluated such that the storage capacity may increase or decrease as needed to achieve the desired device performance balanced with the appropriate storage capacity.

By adaptively modifying channels in use and/or memory capacity, power consumption is reduced and data storage device performance is improved in commonly encountered scenarios, especially in high end devices with many flash channels. As a result, improved utilization of storage capacity in a memory device is obtained.

In one embodiment, a data storage device comprises: a memory device; and a controller coupled to the memory device, wherein the controller is configured to: configure an entirety of the memory device as single level cell (SLC) memory; detect an increase in need for memory device capacity; and convert at least a portion of the SLC memory to multilevel cell (MLC) memory. The controller includes a capacity control module configured to perform the detection. The controller is configured to rewrite a portion of data from SLC memory to MLC memory. The controller is configured to detect a decrease in need for memory device capacity. The controller is configured to convert the portion of MLC memory to SLC memory. The controller is configured to relocate data from MLC memory to SLC memory in response to the converting. The converting occurs as a background operation.

In another embodiment, a data storage device comprises: a memory device; and a controller coupled to the memory device, wherein the controller includes a capacity control module, wherein the controller includes a plurality of channels, wherein each channel is coupled to at least one die of the memory device, and wherein the controller is configured to: predict that an amount of memory that is needed is coupled to a first number of channels that is less than a total number of channels; turn off a second number of channels of the total number of channels; detect an actual use of memory; and determine whether additional channels of the total number of channels should be turned on or off. The controller is configured to turn on at least a second channel of the total number of channels. The capacity control module is configured to track trend of memory usage over a predetermined period of time. The controller is configured to metadata is grouped together to form a metablock, and wherein the metablock is defined per channel of the plurality of channels. The capacity control module is configured to schedule a channel rebalancing management operation or a block rebalancing management operation. The controller is configured to relocate data from a memory location corresponding to the first channel to a memory location corresponding to a different channel in response to the determining. The controller is configured to turn on or turn off channels in response to the determining. The turning on or turning off channels occurs at a predetermined period of time. The turning on or turning off channels occurs as a background operation. The capacity control module is configured to provide the determination on the additional channels and a determination on switching the memory device between single level cell (SLC) memory and multilevel cell (MLC) memory independently.

In another embodiment, a data storage device comprises: means to store data; and a controller coupled to the means to store data, wherein the controller is configured to: adaptively modify properties of the means to store data and channels operating between the controller and the means to store data according to a host device profile, wherein the adaptively modifying comprises one or more of the following: changing from single level cell (SLC) memory to multilevel cell (MLC) memory; changing from MLC memory to SLC memory; opening an additional channel between the controller and the means to store data; and closing a channel between the controller and the means to store data. The adaptive modifying occurs as a background operation. The controller comprises a capacity control module configured to monitor means for data storage usage trends.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller includes a plurality of channels, wherein each channel of the plurality of channels is coupled to at least one die of the memory device, wherein the controller is configured to:
configure an entirety of the memory device as single level cell (SLC) memory;

analyze a usage of the memory device, wherein the usage comprises a use percentage of a total capacity of the memory device during a predetermined period of time;

detect an increase in need for memory device capacity based on the analyzing, wherein the increase in need for memory device capacity is detected if the use percentage is greater than one-third;

open an additional number of channels of the plurality of channels;

determine whether the increase in need for memory device capacity occurs when the entirety of the memory device is configured as SLC memory; and convert at least a portion of the SLC memory to multilevel cell (MLC) memory if the increase in need for memory device capacity occurs when the entirety of the memory device is configured as SLC memory.

2. The data storage device of claim 1, wherein the controller includes a capacity control module configured to perform the detection.

3. The data storage device of claim 1, wherein the controller is configured to rewrite a portion of data from SLC memory to MLC memory.

4. The data storage device of claim 1, wherein the controller is configured to detect a decrease in need for memory device capacity.

5. The data storage device of claim 4, wherein the controller is configured to convert the portion of MLC memory to SLC memory.

6. The data storage device of claim 5, wherein the controller is configured to relocate data from MLC memory to SLC memory in response to the converting.

7. The data storage device of claim 1, wherein the controller is configured to execute a rebalancing management operation after the converting and the opening, wherein the rebalancing management operation comprises rewriting data written to the memory device to at least one die coupled to any channel of the additional number of channels.

8. The data storage device of claim 7, wherein the rebalancing management operation occurs as a background operation.

9. The data storage device of claim 1, wherein the controller is configured to prioritize opening the additional number of channels over the converting.

10. A data storage device, comprising:
means to store data; and
a controller coupled to the means to store data, wherein the controller comprises a plurality of channels, wherein each channel of the plurality of channels is coupled to at least one die of the means to store data, and wherein the controller is configured to:

determine a past usage trend of the means to store data, wherein the past usage comprises a use percentage of a total capacity of the means to store data during a predetermined period of time;

detect an increase in need for capacity of the means to store data, wherein the increase in need for capacity of the means to store data is detected if the use percentage is greater than one-third;

open a number of channels of the plurality of channels;

convert single level cell (SLC) memory to multilevel cell (MLC) memory;

convert MLC memory to SLC memory; and adaptively modify properties of the means to store data and the plurality of channels operating between the controller and the means to store data according to the past usage trend, wherein the adaptively modifying comprises:

determining whether the increase in need for capacity of the means to store data occurs when an entirety of the means to store data is configured as SLC memory;

changing a portion of the means to store data from SLC memory to MLC memory if the increase in need for capacity of the means to store data occurs when the entirety of the means to store data is configured as SLC memory;

changing a portion of the means to store data from MLC memory to SLC memory;

opening an additional channel of the plurality of channels; and closing a channel of the plurality of channels.

11. The data storage device of claim 10, wherein the adaptive modifying occurs as a background operation.

12. The data storage device of claim 10, wherein the controller comprises a capacity control module configured to monitor means for data storage usage trends.

* * * * *